July 20, 1954  A. L. M. A. ROUY  2,684,329
METHOD AND APPARATUS FOR PROMOTING CHEMICAL REACTION
Filed July 7, 1951  8 Sheets-Sheet 1

INVENTOR
AUGUSTE L. M. A. ROUY
BY HIS ATTORNEYS
Howson & Howson

July 20, 1954  A. L. M. A. ROUY  2,684,329
METHOD AND APPARATUS FOR PROMOTING CHEMICAL REACTION
Filed July 7, 1951  8 Sheets-Sheet 2

INVENTOR
AUGUSTE L.M.A. ROUY
BY HIS ATTORNEYS
Howson & Howson

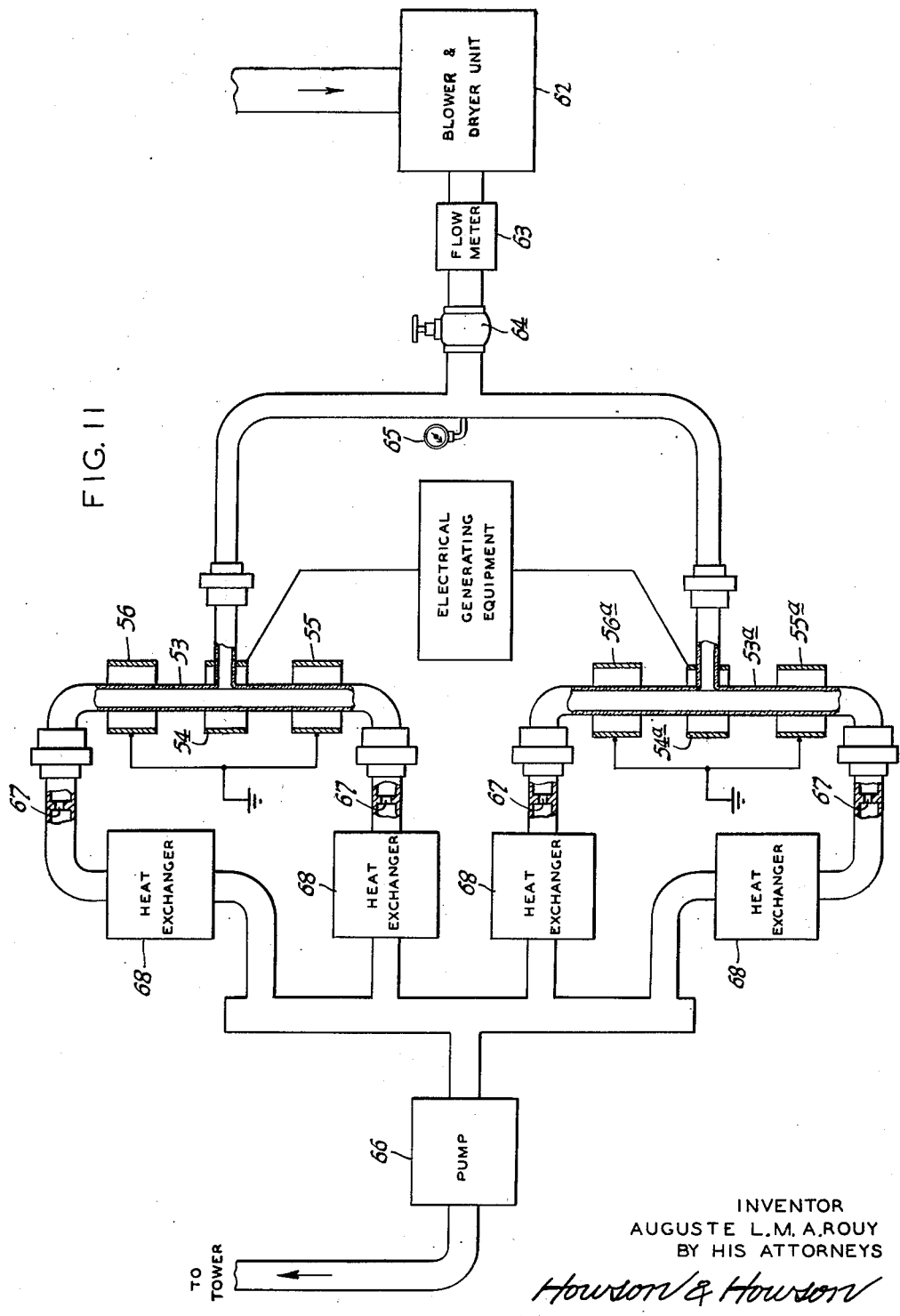

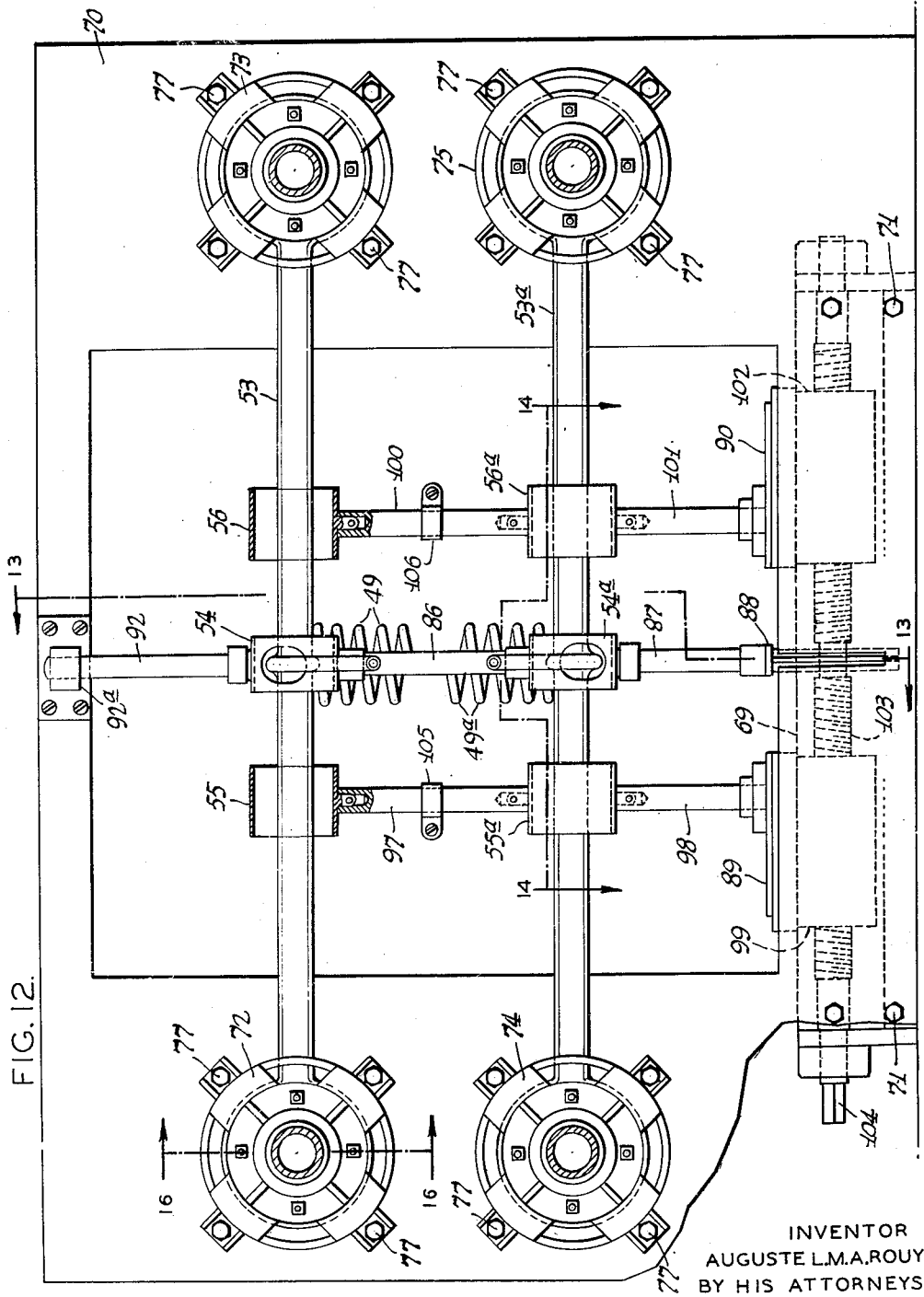

July 20, 1954  A. L. M. A. ROUY  2,684,329
METHOD AND APPARATUS FOR PROMOTING CHEMICAL REACTION
Filed July 7, 1951  8 Sheets-Sheet 6
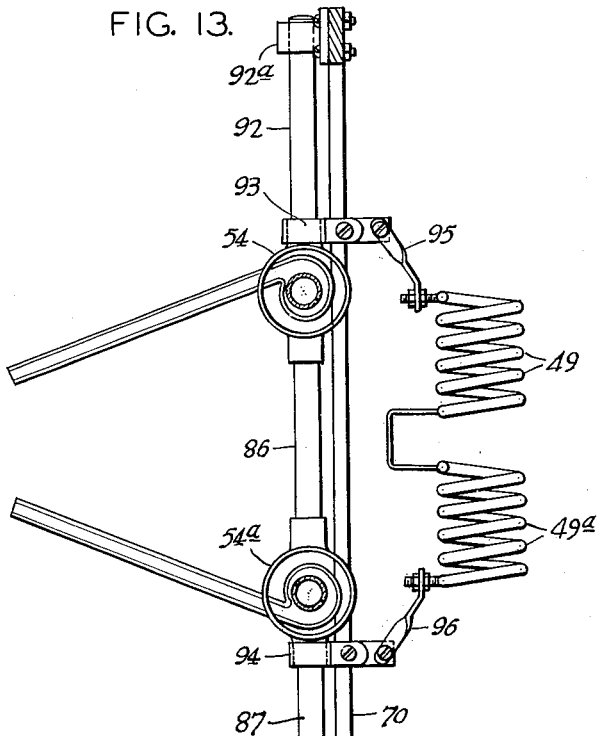
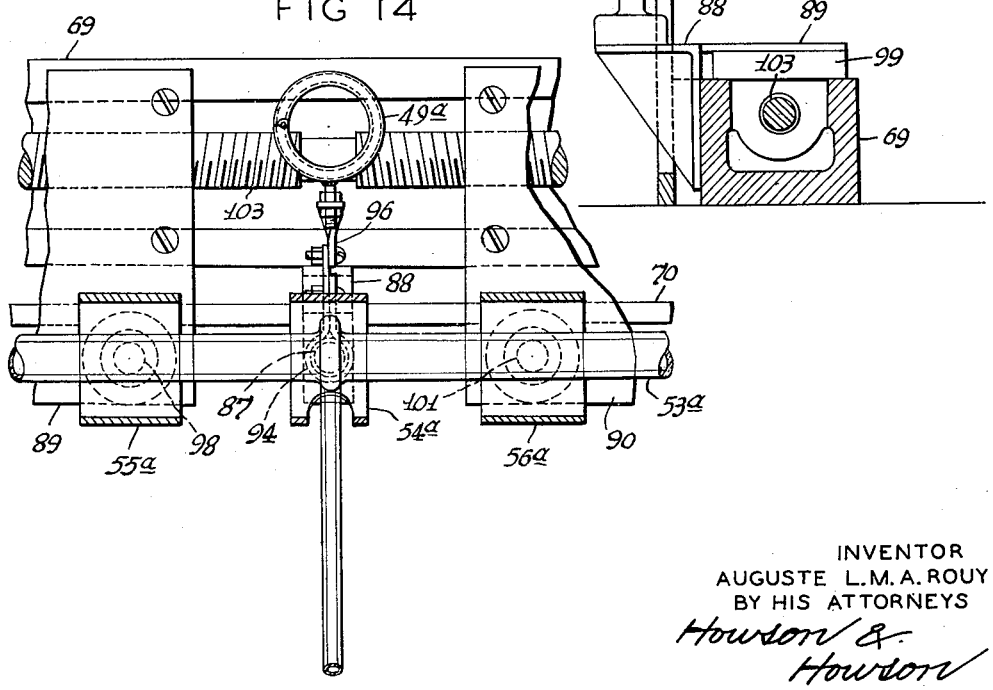
INVENTOR
AUGUSTE L.M.A. ROUY
BY HIS ATTORNEYS
Howson & Howson

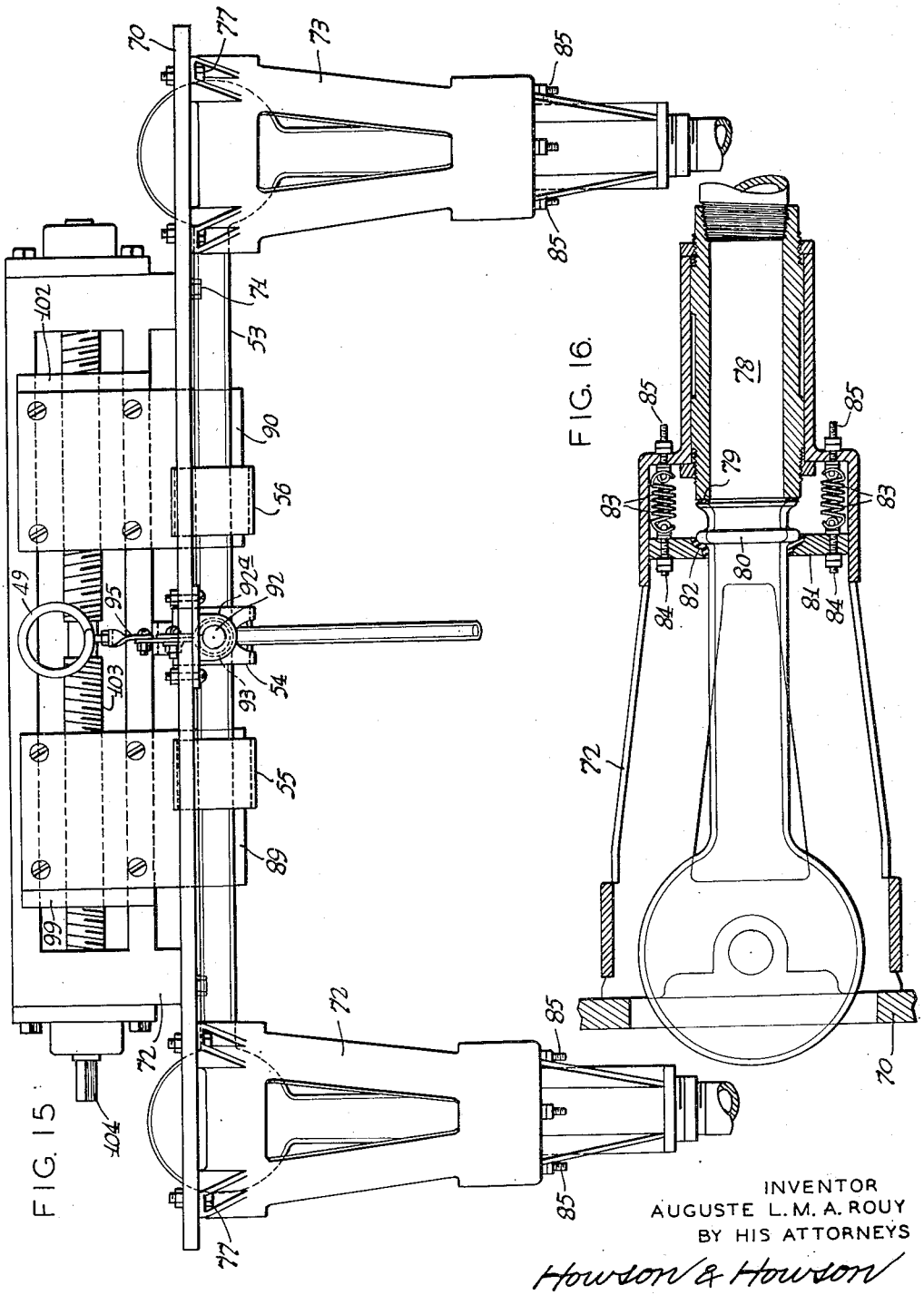

Patented July 20, 1954

2,684,329

UNITED STATES PATENT OFFICE 2,684,329

METHOD AND APPARATUS FOR PROMOTING CHEMICAL REACTION

Auguste Louis Marie Antoine Rouy, Scarsdale, N. Y., assignor to L. L. H. Company, Erie, Pa., a partnership Application July 7, 1951, Serial No. 235,660

5 Claims. (Cl. 204—155)

This application is a continuation-in-part of my application Serial No. 630,440, filed November 23, 1945, now abandoned.

This invention relates to the production or promotion of chemical reactions, to form desired end products, through the medium of alternating fields capacitatively or inductively produced, which are effective to cause ionization of molecules and/or atoms in the gas phase by electron collision.

A specific application of this invention is the fixation of nitrogen resulting in the direct production of $NO_2$ from air for the more economic production of nitric acid.

One object of the invention is to provide an improved method and improved apparatus for the above-mentioned purposes.

Another object of the invention is to provide novel apparatus for the creation of the electric fields employed in carrying out the novel method.

An alternating electric field accelerates the motions of the electrons present in alternate opposing directions at velocities dependent upon the intensity and frequency of the field. Gas molecules, if introduced into such a field may be, in part, dissociated by collision with electrons moving with suitable velocities, with the production of ionized molecules and/or atoms, and/or with the production of non-ionized molecules and atoms at higher energy levels of excitation. Thus by suitable choice of the kind and pressure of the gaseous molecules and by choice of conditions providing suitable electron velocities, it is possible to effect or promote a variety of specific chemical reactions between the ionized particles and/or the unionized but excited molecules and atoms.

I have discovered that chemical reactions of the above type can be most efficaciously effected by (1) the establishment of an alternating electric field, either by capacitive means or by inductive means, which field is characterized by successive zones of diminishing field intensity, ranging from relatively high to relatively low, (2) the provision within this field of a defined gas flow path extending through said zones, and (3) the passage of gas or vapor, at subatmospheric pressure, along said path and through said alternating electric field in a direction such that the reactant molecules enter a zone of high intensity and the product molecules leave the field from a zone of low intensity.

While I have no desire to be bound by any particular theory, I believe that the superior product yields which I have observed to result from the application of the above to a specific reaction, namely, the production of $NO_2$ from air, may be explained as follows: As stated above, an alternating electric field imparts an oscillatory motion to electrons present within that field, and the electrons attain velocities or electron temperatures which are functions primarily of the field strength, gas pressure, and frequency of oscillation of the applied field. It may be presumed that the production of chemical intermediates in the form of ions and/or unionized molecules or atoms in an excited metastable state by electron collision will be most effective at some optimum range of average and maximum electron velocities, or electron temperatures. Thus, by providing a path of defined gas flow through an alternating electric field having a sufficiently wide range of graduated intensities and passing the reactant molecules therethrough, they must necessarily pass through a zone of optimum electron velocity for the production of the preferred intermediate reactive particles. Furthermore, by first subjecting the reactant molecules to a zone of maximum electron velocities, and removing the product molecules from a zone of minimum electron velocities, the danger of dissociation and loss of the new product molecules by collision with electrons moving at destructive velocities is minimized or avoided.

The electron velocities and energies, which of course decrease as the value of the field intensity decreases, are commonly expressed in terms of electron volts. The electron volt is a direct expression of kinetic energy.

For example, NO can be produced from $N_2$, $O_2$ and an electron if the electron has an energy of 17 electron volts; $NO_2$ is produced if the electron has an energy of 23 electron volts. If either of these products is then subjected to electron energy values below these state levels, the probability that it will be decomposed into component parts is smaller than it would be were the products subjected to electron energy values above the cited energy production level.

I have further discovered that to improve the product yields obtainable per unit of electrical power input, not only is it important to direct the reactant gas atoms and/or molecules by means of a confined gas flow path through an alternating electric field of graduated field strength so that the direction of flow is from zones of relatively high intensity to zones of relatively low intensity, but that it is important that the cross-section of the path of confined gas flow be also chosen so as to provide optimum residence time of the reactant atoms and/or molecules within the preferred zones of field intensity and to further design the path of confined gas flow in relation to the geometry of the electric field in such a manner that the path of confined gas flow utilizes to the fullest extent the zones of preferred field intensity which are created by the generating system employed.

To illustrate, in the production of NO₂ from air previously mentioned, I observed that when using the same diameter of reaction tube and rate of air flow, the yield of NO₂ per unit of power consumed is substantially increased by using a center-fed reaction tube and field intensities decreasing from the center along both halves of the tube, as compared with the use of an end-fed reaction tube and field intensities decreasing from the feed end. In the case of the end-fed reaction tube, the gas stream is first subjected to a zone of high field intensity and leaves at zones of low field intensity. In the case of the center-fed reaction tube, the gas is first subjected to a zone of high field intensity but then divides and passes through two series of zones of intermediate and low field intensities which are mirror images of one another. It should be noted that the center-fed tube effectively doubles the cross-section of the gas flow path, and yet maintains the same field strength distribution within the tube. In one example the NO₂ per kw. h. for the center-fed reaction tube was 50% greater than the end-fed reaction tube. Analysis will show that the only significant differences in the history of the processed air may be described as follows. While the same total volume of air is introduced in both cases at the zone of maximum field intensity, in the case of the center-fed reaction tube there are two series of intermediate zones of graduated field strength and, therefore, two possible zones of preferred field intensity. Moreover, the residence time of a given air mass in each of the zones of preferred intensity in substantially longer in the case of the center-fed reaction tube than in the case of the end-fed reaction tube.

In other words, I have discovered that the maximum product yield per unit of electrical power consumed requires:

(1) The creation of alternating electric field intensities graduated from high intensity to low intensity.

(2) The creation within those field intensities of a confined path of gas flow of suitable dimensions to permit optimum residence time of the reactant molecules within zones of preferred field intensities.

It is obvious that the configuration of the confined path of gas flow and the electric field or fields should preferably be further adjusted to permit maximum utilization of the zones of preferred field intensity which are created by the electrical system employed, if the product yields per unit of electrical power are to be a maximum. I do not wish, therefore, to be limited to the particular means herein described of defining the paths of confined gas flow within an alternating electric field or fields of graduated field intensities whereby the volume of the discharge plasma within that path may be suitably increased or decreased in zones of preferred or critical electron velocities required to effect the desired reactions.

Many other means of varying the effective volume of the discharge plasma or residence time of the reactant molecules within different portions of a confined gas path within an electric field of suitably graduated intensities will be obvious, such as special enlargements or constrictions, flattened circular gas containers in which the gas is supplied at the center and removed at the periphery, etc.

Reference is now made to the accompanying drawings, wherein:

Fig. 11 is a simplified diagrammatic illustration of the complete apparatus, showing particularly the flow system;

Fig. 12 is a front elevational view of the actual reaction apparatus employed;

Fig. 13 is a sectional view taken along line 13—13 of Fig. 12;

Fig. 14 is a sectional view taken along line 14—14 of Fig. 12;

Fig. 15 is a plan view of the reaction apparatus;

Fig. 16 is a sectional view taken along line 16—16 of Fig. 12; and

Figure 1:
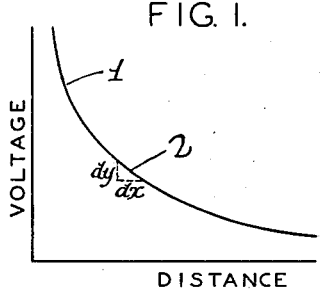
Figs. 1 to 4 are simple illustrations serving to demonstrate the principal concepts and features of the present invention.

Referring more particularly to the drawings, Fig. 1 shows a graph or curve 1 of the voltage of an electric field of the general character utilized according to the present invention, the curve showing the voltage variation along the length of the electric field. It will be seen that the voltage is a maximum at one end of the field, and it decreases progressively toward a minimum at the other end of the field. At any particular zone, e. g. zone 2, along the field the voltage gradient is represented by the slope of the voltage curve 1 at that zone. In other words, the voltage gradient is equal to $$\frac{dy}{dx}$$

(In this application the terms "field strength," "field intensity" and "voltage gradient" are used synonymously.) Thus, the field strength or intensity is a maximum at the left hand end of the field, as represented in Fig. 1, and decreases progressively until it reaches a minimum at the right hand end of the field.

Figure 2:
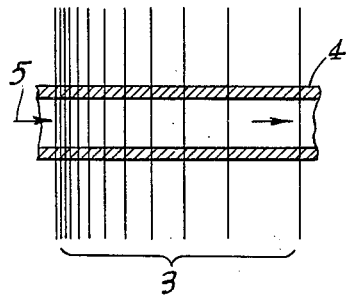

In Fig. 2, the varying voltage gradient or field intensity of the electric field graphically depicted in Fig. 1 is represented by parallel equipotential lines 3 drawn for equal voltage drops, whose spacing at any particular zone of the field indicates the voltage gradient or field intensity at that zone. Of course, the straight parallel lines are employed here merely to show clearly the character of the electric field and are not intended to represent actual equipotential lines obtained in practice.

Suppose now that a reaction tube 4 is provided as shown, with the tube extending longitudinally through the electric field. In accordance with the present invention, reactant gas or vapor is caused to flow in the tube 4 in the direction indicated by arrow 5 so that the gas or vapor enters the field at the zone of maximum intensity, and the reaction products leave the field at the zone of minimum intensity. Thus, in the case of the production of an oxide of nitrogen, such as NO₂, air would be caused to flow in the tube 4 under predetermined conditions of pressure and mass velocity. As the reactant gas or vapor traverses the tube 4, it is subjected successively to high, intermediate and low field intensities. As previously stated, this method of processing the reactant gas or vapor gives optimum yields of reaction products. Actual tests have shown that the flow of the reactant gas or vapor in the direction of progressive decrease of field intensity gives approximately 30% greater yield of a desired reaction product than does flow of the gas or vapor in the opposite direction. The reason for this difference is believed to reside in the explanation hereinbefore given. Thus, it appears that there is an optimum zone along the electric field, which is most conducive to the desired chemical reaction and, due to the character of the field, highly destructive field intensities beyond the optimum zone are avoided.

As indicated previously, the electric field may be produced either by capacitive means or by inductive means. Thus, in Fig. 2 the electric field may be created by a pair of spaced capacitive members surrounding the tube, one maintained at ground potential and the other having an alternating voltage applied thereto so as to provide decreasing field intensity toward the grounded member. Preferably, the field is created by means external to the reaction tube as described hereinafter, and not by means of conventional internal electrodes.

In a system of the character represented in Fig. 2, the action which takes place within the reaction tube is affected by the field conditions, the rate of gas flow, and the pressure of the gas within the tube. The rate of gas flow in part determines the residence time of the gas within the electric field, and also governs the rate of removal of the gas from the discharge region. The pressure of the gas determines the mean free path of the molecules.

The action within the tube involves a resistive type self-sustaining discharge in which the electrons make many collisions with gas molecules per cycle of oscillation of the electric field, and these collisions constitute the chief mechanism of electron and ion production for discharge maintenance. In any particular apparatus, the frequency of the alternating electric field should be low enough to permit many electron-molecule collisions per cycle of the electric field and yet high enough to prevent loss of ions and electrons that might occur if the latter were permitted to travel throughout the entire length of the field during a cycle thereof.

The field intensities are in part determined by the controlling voltage of the power source which supplies the alternating electric field. As hereinafter described with reference to a pilot apparatus that has been operated experimentally, the power source may comprise an electronic power amplifier excited by a driver unit in which case the plate voltage of the power amplifier is the input voltage which in part determines the field intensities. It will be apparent that the input voltage, gas pressure, and the frequency are interrelated in that they primarily determine the electron velocities.

In any particular case, the input voltage and the frequency may be chosen according to the physical characteristics and capabilities of the particular equipment employed, and the pressure of the gas being processed may be adjusted to give optimum results for any particular mass flow or velocity of the gas. This will be more clearly understood from the description hereinafter of the above-mentioned pilot apparatus, with respect to which illustrative data is given.

From the foregoing, it will be seen that the several parameters involved in the practice of the present invention are related and should be chosen in relation to one another to give the best results in any particular instance. It should be noted that these individual parameters are not independently critical, and all that is required is the judicious selection thereof for optimum operation within the capabilities of the particular equipment employed.

Figure 3:
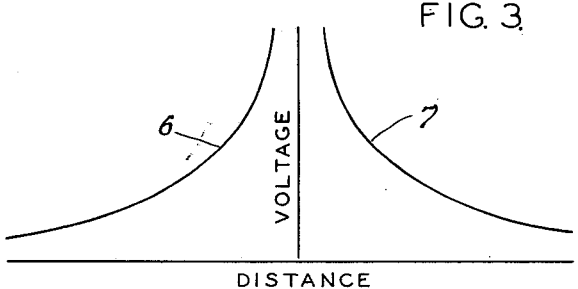
Figure 4:
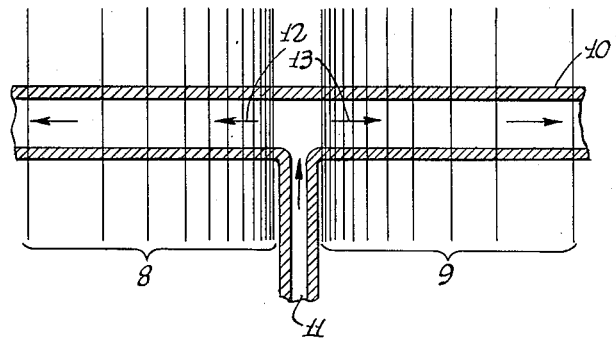

In Fig. 3, there are shown two voltage graphs or curves 6 and 7 of two electric fields, each of which is similar to the field represented in Fig. 1 and which decrease in intensity in opposite directions. In Fig. 4, the equipotential parallel lines 8 and 9, drawn for equal voltage drops, indicate variation of the field intensities in opposite directions. Fig. 4 also shows a reaction tube 10 having a central inlet 11, each half of the tube being of the same length and same diameter as the tube in Fig. 2. The arrangement in Fig. 4 represents the preferred arrangement in which the reactant gas or vapor is fed into the tube through the central entrance 11 and then divides and flows in the directions of the arrows 12 and 13. The gas flowing in each half of the reaction tube 10 is subjected to progressively decreasing electric field intensities. It has been found from actual comparative tests that a center feed arrangement gives an increase in yield per unit power input of about 50% over an end feed arrangement. Recycling of the gas through an end-fed tube, so that the gas leaving the zone of lower field strength is forced to enter again the zones of higher field strength, does not produce any increase in the concentration of the reacted product, e. g. $NO_2$. In fact, the products already formed tend to be destroyed by being subjected to the higher field intensities, with a corresponding waste of energy or power. As previously indicated, the arrangement of Fig. 4 is merely one of various possible arrangements in which the defined gas path is modified from the straight unidirectional path of Fig. 2.

Figure 5:
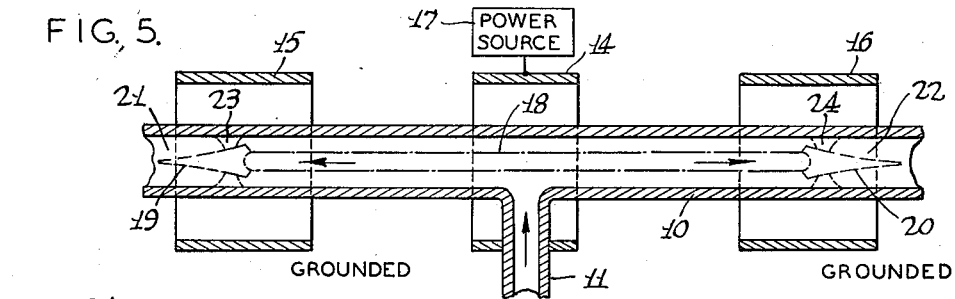
Figs. 5 to 9 are simple illustrations of various embodiments of the invention.

Fig. 5 shows an arrangement according to Fig. 4 in which the electric fields are created by capacitive members 14, 15 and 16 arranged with respect to the tube 10 and with respect to one another as illustrated. These members are in the form of circular bands or sleeves surrounding the tube 10 in spaced relation thereto. As indicated, the outer members 15 and 16 are grounded, and an alternating voltage is applied to the central member 14 from a power source represented by block 17. By reason of this arrangement, alternating electric fields are created within tube 10 on opposite sides of the entrance 11, the fields being of the character represented in Fig. 4.

Fig. 5 also indicates the luminous colorations which are observable in the discharge when the apparatus is used for the production of oxides of nitrogen. Opposite the inlet 11 is a region 18 having a reddish-purple coloration. At the ends of the region 18 are tapering regions 19 and 20 having an orange coloration. Surrounding the above-mentioned regions are regions 21 and 22 having a yellow-green coloration, and surrounding the regions 19 and 20 are annular bluish regions 23 and 24.

Figure 6:
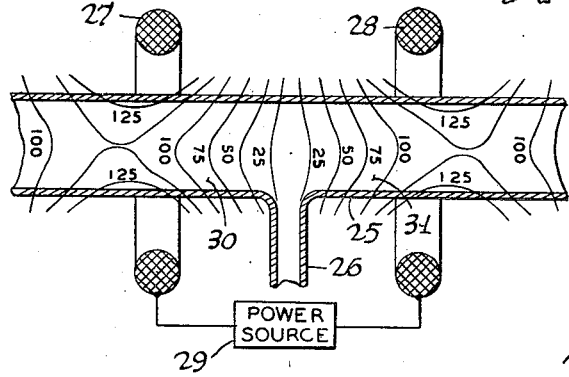

In Fig. 6 there is shown a center-fed tube arrangement wherein the electric fields are produced by means of capacitive members in the form of rings. The reaction tube 25 has a central entrance 26, on the opposite sides of which are rings 27 and 28. A power source 29 is connected to the rings 27 and 28. The numbered lines are equipotential lines and show the electric field pattern. There are effectively two fields 30 and 31 whose voltage gradients are a maximum in the vicinity of the central entrance and decrease progressively outwardly.

In the arrangement of Fig. 6, the capacitive members 27 and 28 could be in the form of bands or sleeves. The advantage of the latter form is that it gives greater electrical capacity between the capacitive members and the gaseous medium in the reaction tube. In the preferred form of the invention, the bands or sleeves are utilized to obtain the desired electrical capacity or capacitance and thus the desired capacitive reactance.

Figure 7:
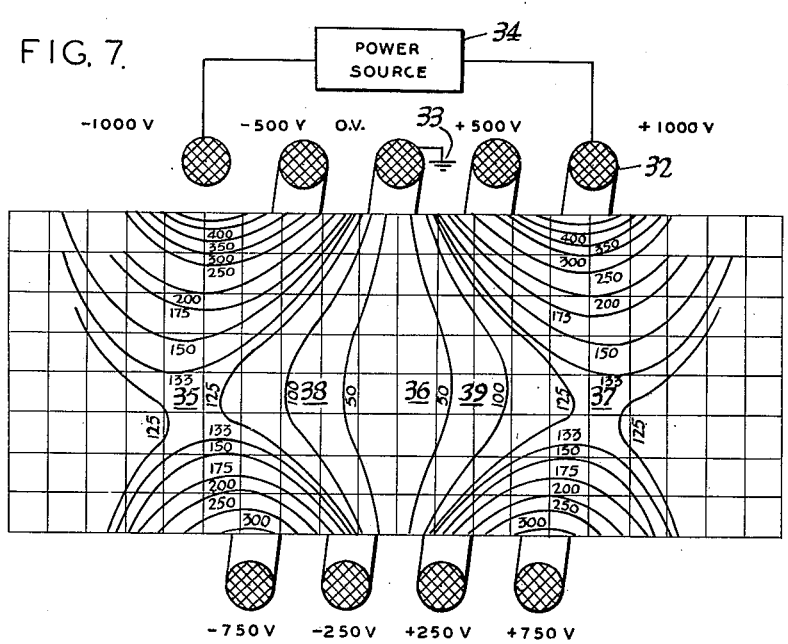

As previously stated, the electric field employed according to the invention may be created capacitively or inductively. In the above-described arrangements, the field is created capacitively. Fig. 7 shows substantially to scale, the electric field distribution within a four-turn helical coil 32 (diameter 10.5 cm., length 10 cm.), the midpoint of which is grounded at 33. A power source 34, which could be a center-tapped oscillator, is connected to the ends of the coil. Thus, the coil might be included in the output or tank circuit of an oscillator. The numbered lines are equipotential lines of the electric field, the numbers indicating approximate voltages, and illustrating the general field distribution, it being assumed that an alternating voltage of 1000 volts is applied across the coil. Of course, the polarities indicated represent the condition during one-half cycle. From this illustration, it can be seen that along the axis of the coil, the field strength is maximum at 36, intermediate at 38 and 39, and low at 35 and 37.

Figure 8:
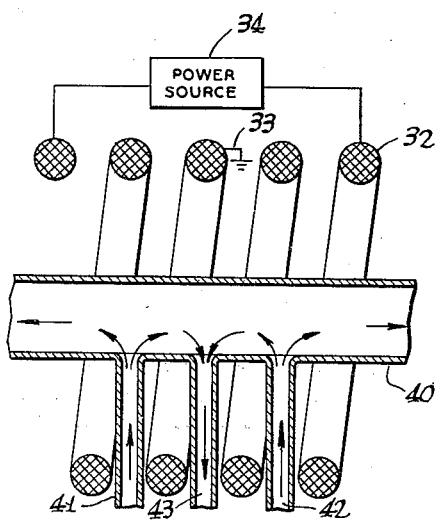

Fig. 8 shows an arrangement, according to the present invention, using the coil of Fig. 7 as the field-creating means. A reaction tube 40 is arranged within the coil 32 and is provided with inlets 41 and 42 and an auxiliary central outlet 43. In this arrangement, the reactant gas or vapor enters the electric field at very high field intensities in the vicinity of the coil conductors and reaches the high intensity zones 38, 39 shown in Fig. 7. The reaction products leave the electric field at the low intensity zones 35 and 37 and also from the zone of relatively high field intensity 36 toward the zero field intensity represented by the neutral plane of the coil. It will be seen that the arrangement of Fig. 8 corresponds generally to the arrangements of Figs. 5 and 6 in that the gas is divided and the divided portions pass through different portions of the electric field.

Figure 9:
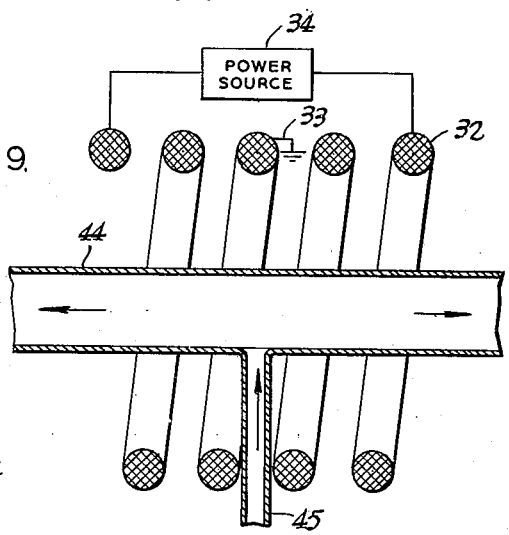

Fig. 9 shows a less desirable arrangement employing the coil 32, in which the reaction tube 44 is provided with a central inlet 45, the tube being similar to that employed in the arrangements of Figs. 5 and 6. In this instance, the gas enters the tube through the central inlet 45, and while it enters the inside electric field at the low intensity neutral plane, it reaches the high intensity field zone 36 (Fig. 7) and passes successively through intermediate intensity zones 38, 39 and low intensity zones 35, 37. The action which takes place in the tube is quite similar to that which takes place in the arrangement of Fig. 5. In the production of oxides of nitrogen, the colorations observed are the same as indicated in Fig. 5 and above described.

In any arrangement such as those above described, it is necessary that the electric field-creating member or members be sufficiently spaced from the reaction tube to preclude voltage breakdown or arc-over. It is also desirable that the reaction tube be of such diameter in relation to the electric field as to utilize the best portion of the field for the purposes involved. It has been found that suitable operation is obtained where the ratio of the internal diameter of the tube to the internal diameter of the field-creating member or members is not in excess of .4. In the case of a coil, it has also been found desirable to have the length of the coil about equal to the diameter thereof. While, in the case of a coil, a magnetic field is also present due to the current flowing in the coil, such field is inconsequential insofar as the present invention is concerned and may be disregarded.

From the foregoing description, it will be seen that the present invention provides a method of promoting gas phase chemical reaction in a reaction zone within a gas-conveying enclosure through ionization and excitation of gas molecules and atoms by a resistive type discharge characterized by multiple electron-molecule and atom collisions per cycle of a high frequency alternating electric field, which comprises creating in said zone, by means of electrical structure arranged in predetermined spaced relation to the wall of said enclosure, a high frequency alternating electric field which is of substantially constant intensity transversely of said zone at any point therealong within said field and in which the voltage gradient decreases longitudinally of said zone from a maximum magnitude through a range of progressively decreasing magnitudes, the spacing of said electrical structure from said enclosure being sufficient to preclude voltage breakdown of the enclosure and to provide the aforementioned progressively decreasing magnitudes throughout the reaction zone, said maximum magnitude being sufficient to achieve the aforesaid ionization and excitation, introducing reactant gas initially into the maximum magnitude portion of said electric field in said zone, flowing the reactant gas in said zone through said electric field from the maximum to a decreased magnitude portion thereof at a subatmospheric pressure to provide multiple electron-molecule and atom collisions per cycle of the alternating field, whereby substantially all of the flowing gas molecules and atoms in said zone are subjected first to maximum electron velocities and then are subjected in succession to progressively decreasing electron velocities, and removing reaction products from said zone after passage of the reactant gas through a portion of said electric field in said zone wherein the reaction products are formed. It will also be seen that the invention provides novel structural arrangements for performing the above method.

Figs. 10 to 16 illustrate the aforementioned pilot apparatus which has been used experimentally for nitrogen fixation, and by means of which $NO_2$ is produced directly from air for simple conversion to nitric acid.

Figure 10:
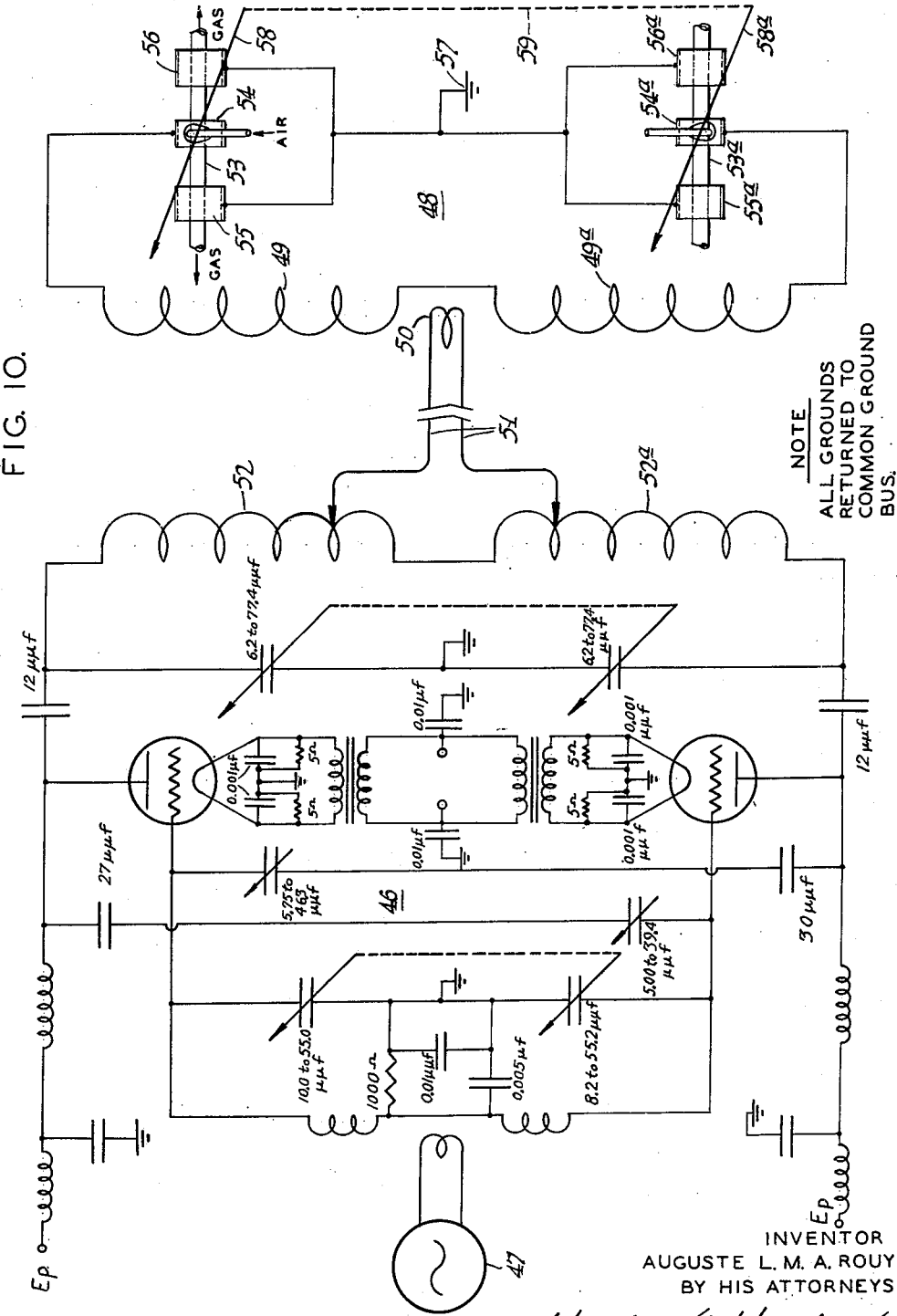
Fig. 10 is a diagrammatic illustration of the electrical system of a pilot apparatus that has been operated experimentally.

Referring first to Fig. 10, which shows the electrical system employed, the apparatus utilizes an 18 kw. generator comprising a power amplifier designated generally by reference numeral 46 which is excited by a driver unit 47. Power amplifier 46 is conventional and is of the class C, tuned-grid, tuned-plate, push-pull type. The driver unit 47 is also conventional and in the actual apparatus is a crystal-controlled oscillator buffer-doubler. The plate and filament voltage for the power amplifier are supplied from a conventional power supply (not shown). The amplifier is tuned to the frequency of the driver unit and it supplies alternating working power at the operating frequency to the connected load through its tuned output circuit. The input power to the amplifier in any instance is equal to the product of the plate voltage and plate current, i. e. $E_pI_p$, yields and power consumption in this application are expressed as functions of input amplifier power ($E_pI_p$) and not in terms of working power in the load. In the actual use of the apparatus, the electrical system has been operated at a frequency of 27.2 mc. and a plate voltage of 4500 volts.

The electric field-creating members employed in the reaction apparatus are included in a load tank circuit designated generally by reference character 48 which includes coils 49 and 49a. Inductively associated with the latter is a link coil 50 which is connected by conductors 51 to tap points on the amplifier output coils 52 and 52a.

In this apparatus, there are two center-fed reaction tubes 53 and 53a which are supplied with air from a common input as hereinafter described. Each of the reaction tubes has associated with it an electric field-creating arrangement of the character shown in Fig. 5. Thus, as shown in Fig. 10, reaction tube 53 has associated with it a central capacitive member 54 and two outer capacitive members 55 and 56. Similarly, reaction tube 53a has associated with it a central capacitive member 54a and two outer capacitive members 55a and 56a. The outer capacitive members are grounded, as indicated at 57 so that they are maintained at ground or zero potential. As indicated, all grounds in the system are returned to a common ground bus. The central capacitive members 54 and 54a are connected to the outer ends of the serially-connected coils 49 and 49a. As indicated by the arrows 58 and 58a, and by the dotted line 59, the capacitances of the capacitors constituted by the field-creating capacitive members are jointly variable by adjustment of the relative spacings of said members, as hereinafter more fully described.

In operation of the apparatus, each reaction tube and its associated field-creating members operate to process the air supplied to the tube according to the arrangement shown in Fig. 5 as hereinbefore described. In starting the operation, the outer capacitive members are moved toward the central capacitive members until sufficient electrical capacity is had to cause circuit resonance and produce the discharge in each of the reaction tubes. The discharge causes an increase in capacitance which must be compensated for to re-resonate the load tank circuit 48. This is accomplished by moving the outer capacitive members away from the central capacitive members while observing the plate current of the power amplifier 46. When the plate current is at its maximum value, the load tank circuit 48 is tuned exactly to the frequency of the driver unit 47, which is also the tuned frequency of the power amplifier 46.

In some instances, it might be desirable to provide a certain fixed spacing of the field-creating members. In such case, the tuning of the load tank circuit 48 could be effected by means of auxiliary variable condensers.

In operation of the apparatus, the voltage gradient of each electric field produced by the field-creating members will depend in part upon the spacing of said members and the input D. C. voltage, i. e. the plate voltage $E_p$. With a particular spacing of the field-creating members, increasing the input voltage will cause an increase of the voltage gradient along the field.

Fig. 11 is a simplified diagram of the gas flow system employed in the apparatus. In the production of $NO_2$, atmospheric air is introduced into dryer and blower equipment represented at 62, and the dried air is fed through a flow meter device represented at 63 and through valve means 64 to the reaction apparatus comprising reaction tubes 53 and 53a. A pressure gauge is connected to the system at 65. The flow through the reaction apparatus is produced by a vacuum pump 66. The reaction products from the reaction tubes 53 and 53a are fed through orifices 67 and through heat exchangers 68 to the pump 66. The pressure of the part of the system under vacuum is controlled by the valve means 64 and also by the orifices 67. By allowing a measured rate of air flow to enter the reaction tubes through the valve means 64, the mass flow can be held constant while the pressure is varied by the orifices 67. This system pressure is measured by the pressure gauge connected at 65, and is the gas pressure referred to throughout this specification.

The fixed nitrogen is substantially in the form of $NO_2$ and $N_2O_4$, and it is supplied from pump 66 to a conventional absorption tower (not shown) where it is absorbed in water to form nitric acid.

Referring now to Figs. 12 to 16, these figures show the mounting arrangement employed to support the reaction tubes and the associated field-creating members. The supporting structure comprises a rigid base member 69 and a vertical frame member 70 secured thereto as by bolts 71. The reaction tubes 53 and 53a are supported on frame 70 by means of supports 72, 73, 74 and 75, each support being secured to frame 70 by means of bolts 77. As may be seen in Fig. 16, each of the tube supports carries an outlet pipe section 78, and the associated outlet portion of the reaction tube is in sealing relation with the pipe section through a gold-covered asbestos gasket 79. The outlet portion of the tube has an annular enlargement or flange 80 to which force is applied to effect the seal at gasket 79. To this end, a plate 81 is arranged to exert force on flange 80 through asbestos washer 82, and the plate is caused to exert such force by means of a number of helical tension springs 83 secured between plate 81 and the support by means of spring holders 84 and 85. During normal operation under subatmospheric pressure in the vessel, the outside atmospheric pressure builds up reaction forces acting in the same way as the springs do.

Referring to Figs. 12 and 13, the central capacitive members 54 and 54a are interconnected by means of an insulating rod or tube 86 and are supported on an insulating rod or tube 87 carried by a supporting bracket 88. The latter is secured to the base member 69, as by welding. An insulating rod or tube 92 extends upwardly from member 54, and is rigidly anchored to frame 70 by means of bracket 92a. The coils 49 and 49a are supported by and electrically connected to members 54 and 54a by means of metal clamp brackets 93 and 94 and connecting links 95 and 96.

The outer capacitive members 55 and 55a are interconnected by a metal tube or rod 97 and are supported by an insulating rod or tube 98 mounted on a bracket 89 secured to a carriage 99. Similarly, the outer capacitive members 56 and 56a are interconnected by a metal tube or rod 100 and are supported by an insulating rod or tube 101 mounted on a bracket 90 secured to a carriage 102. The carriages 99 and 102 are engaged by right and left hand threads of a rotatable shaft 103 which is rotatably supported by base member 69. The latter is channeled to accommodate the carriages and to serve as a track therefor. Projecting end 104 of shaft 103 is of non-circular cross section, e. g. square, to be engaged by a crank or other device for rotation of the shaft. In this way, the spacing between the outer capacitive members and the central capacitive members may be varied at will, while maintaining an equidistant relationship between the members.

Ground straps 105 and 106 are provided on rods 97 and 100, through which the outer capacitive members are electrically connected to the common ground bus.

In the actual apparatus shown in Figs. 10 to 16, the values of the circuit components indicated in Fig. 10 are employed and the other components of interest are physically characterized as follows:

The reaction tubes 53 and 53a are quartz tubes having an average outside diameter of 32 mm. and a wall thickness of about 1 mm.

The central capacitive members 54 and 54a are 2.5" wide, and have outside and inside diameters of 3.875" and 3.5" respectively. The outer capacitive members 55, 56, 55a and 56a are 3.125" wide and have the same outside and inside diameters as the central members.

The load coils 49 and 49a each comprises 5 turns of 0.375" copper tubing, with a mean turn diameter of 3.875" and with a spacing of 0.5" between adjacent turns.

The link coil 50 comprises 2 turns of 0.375" copper tubing, with a mean turn diameter of 4" and with a spacing of 1.0".

The 52 and 52a each comprises 5 turns of 0.75" copper tubing, with a mean turn diameter of 4.25" and with a spacing of 0.5" between adjacent turns, the tap being located between the fourth and fifth turns from the outer end.

The input coils of the power amplifier each comprises 3 turns of 0.25" copper tubing, with a mean turn diameter of 2.4375" and with a spacing of 0.3125" between adjacent turns.

Figure 17:
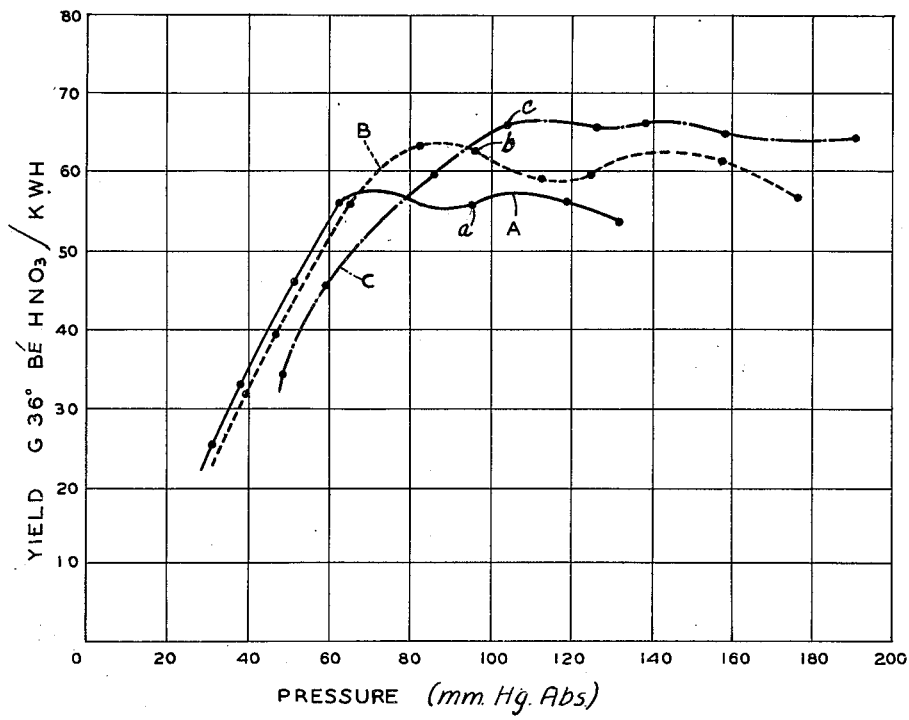
Figs. 17 and 18 are graphs which were plotted from actual operation of the apparatus.
Figure 18:
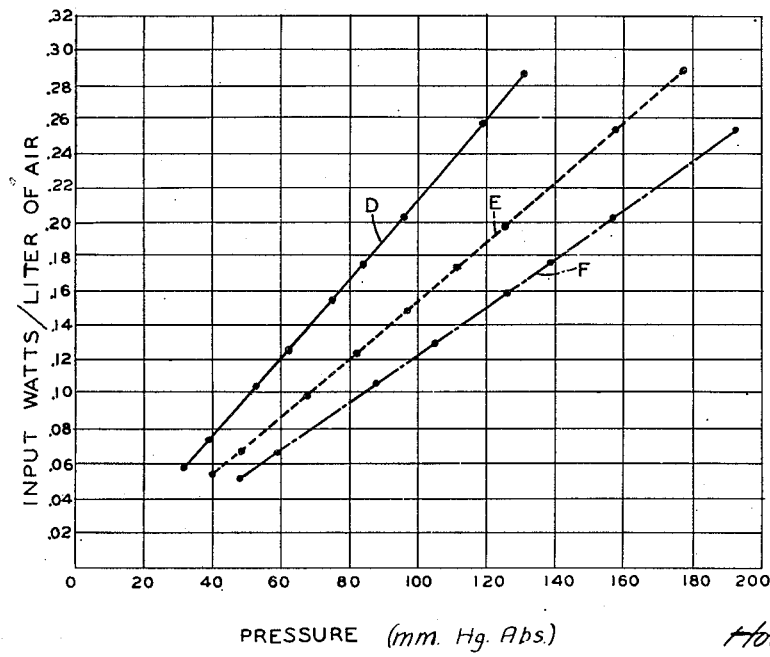

Figs. 17 and 18 are graphs which were plotted from actual operation of the above-described pilot apparatus in the production of nitric acid. During such operation an input voltage ($E_p$) of 4500 volts and a frequency of 27.2 mc. were employed. The graphs were taken for three different mass velocities of the air, as indicated below.

Referring to Fig. 17, it shows nitric acid yield per kilowatt hour power consumption at different air pressures. Graph A is for a mass velocity of about 5,000 liters per hour, graph B is for a mass velocity of about 7,000 liters per hour, and graph C is for a mass velocity of about 9,000 liters per hour. It will be seen that the maximum yields for the different mass velocities were obtained at different pressures, and by means of such graphs it is readily possible to select the optimum pressure for the particular mass velocity employed.

It should be noted that strictly speaking that mass velocity should be expressed as unit weight per unit of time, but in this application it is expressed as unit volume per unit of time.

The following chart shows data of interest with respect to points, $a$, $b$ and $c$ of the respective graphs, which points are in the neighborhood of 100 mm. pressure. The chart shows the effect of mass flow on yield while holding the pressure substantially constant.

| Graph Point | System Press. (mm. Hg Abs.) | Yield, g. 36° Bé. HNO$_3$/ kw. h. | Air Mass Flow, l./hr. @ S. C. | Watts Input ($E_p \times I_p$) |
|---|---|---|---|---|
| a | 96.0 | 55.86 | 5,129 | 8,215 |
| b | 96.5 | 62.23 | 7,103 | 8,400 |
| c | 104.5 | 65.92 | 9,242 | 8,595 |

Fig. 18 shows graphs of input watts per liter of air against pressure for the three different mass velocities above mentioned. Graph D is for a mass velocity of about 5,000 liters per hour, graph E is for a mass velocity of about 7,000 liters per hour, and graph F is for a mass velocity of about 9,000 liters per hour.

It will be seen from Fig 18 that at any particular pressure, the power consumption per liter of air is lower for higher mass velocity, and it will also be seen that the rate of increase of power consumption with increase of pressure is lower with higher mass velocity.

Although the aforementioned parent application indicates yields of nitric acid which are higher than those shown in Fig. 17, actually the later work represented in Figs. 17 and 18 involved lower power consumption per liter of air for a given yield per kw. h. Thus the later work shows substantial increase in efficiency of production for a given energy input to a specific amount of gas.

While the graphs of Figs. 17 and 18 were taken over a range of pressures from about 30 mm. to about 190 mm., it is not to be understood that the invention is limited to such range of pressures. As previously indicated, the invention contemplates the use of subatmospheric pressures. It should be remembered that the gas pressure is simply one of the several parameters whose values are chosen in relation to one another and according to the particular equipment employed. For given values of input voltage and frequency of the particular equipment, it is readily possible to select optimum values of mass velocity and pressure by plotting graphs of the character shown in Figs 17 and 18. Experiments indicate that it is desirable to operate somewhere within a pressure range of about 10 mm. to about 500 mm., with a preferred range extending from about 100 mm. to about 300 mm.

With respect to amplifier input voltage and operating frequency, as indicated above, these will depend largely upon the equipment employed in any particular instance. In the experimental practice of this invention, amplifier input voltages up to 12,000 volts have been used, and frequencies from .5 mc. to 70 mc. have been used. Generally speaking, any frequency that will maintain the resistive discharge hereinbefore described may be used up to whatever limit is imposed by engineering design and availability of equipment. At the present state of the art, it is thought that such limit would be in the neighborhood of 150 mc. A preferred range of operating frequency is from about 10 mc. to about 50 mc.

The invention is applicable generally to reactions in which reacting substances can be acted upon in gas or vapor phase. As examples of reactions which may be produced within the same range of pressure, frequency and voltage used for the production of oxides of nitrogen are the production of ammonia by feeding of nitrogen and hydrogen to the reaction tube, and the production of sulphur trioxide from sulphur dioxide and oxygen, and the production of miscellaneous aldehydes by means of the reaction between methane and carbon dioxide or between hydrogen and carbon monoxide.

In the appended claims, the expression "resistive type discharge" is intended to mean specifically a discharge of the character hereinbefore described.

The world "gas" as used in the claims is intended to mean either gas or vapor.

While various embodiments of the invention have been illustrated and described, the invention is not limited thereto, but is capable of such modifications and further embodiments as may occur to those skilled in the art.

I claim:

1. A method of promoting gas phase chemical reaction in a reaction zone within a gas-conveying enclosure through ionization and excitation of gas molecules and atoms by a resistive type discharge characterized by multiple electron-molecule and atom collisions per cycle of a high frequency alternating electric field, which comprises creating in said zone, by means of electrical structure arranged in predetermined spaced relation to the wall of said enclosure, a high frequency alternating electric field which is of substantially constant intensity transversely of said zone at any point therealong within said field and in which the voltage gradient decreases longitudinally of said zone from a maximum magnitude through a range of progressively decreasing magnitudes, the spacing of said electrical structure from said enclosure being sufficient to preclude voltage breakdown of the enclosure and to provide the aforementioned progressively decreasing magnitudes throughout the reaction zone, said maximum magnitude being sufficient to achieve the aforesaid ionization and excitation, introducing reactant gas initially into the maximum magnitude portion of said electric field in said zone, flowing the reactant gas in said zone through said electric field from the maximum to a decreased magnitude portion thereof at a subatmospheric pressure to provide multiple electron-molecule and atom collisions per cycle of the alternating field, whereby substantially all of the flowing gas molecules and atoms in said zone are subjected first to maximum electron velocities and then are subjected in succession to progressively decreasing electron velocities, and removing reaction products from said zone after passage of the reactant gas through a portion of said electric field in said zone wherein the reaction products are formed.

2. Apparatus for the promotion of chemical reaction through ionization and excitation of molecules and atoms in gaseous phase by a resistive type discharge characterized by multiple electron-molecule and atom collisions per cycle of a high frequency alternating electric field, comprising a reaction tube having a central entrance means and end exit means, three capacitive members surrounding the reaction tube in predetermined spaced relation thereto, one of said members being centrally located and the other two members being in oppositely spaced relation to the central member longitudinally of the reaction tube, means for applying a high frequency alternating voltage to the central capacitive member, means for maintaining the outer capacitive members at ground, whereby to create within said tube a high frequency alternating electric field which is of substantially constant intensity transversely of the reaction tube at any point therealong within said field and in which the voltage gradient decreases longitudinally of the reaction tube from a maximum magnitude in the vicinity of the central entrance means through a range of progressively decreasing magnitudes toward each end exit means, the ratio of the internal diameter of said tube to the internal diameter of said capacitive members being less than the ratio at which voltage breakdown of the tube will occur and at which the aforesaid substantial constancy of intensity is precluded, and means for effecting flow of reactant gas at subatmospheric pressure into said entrance means and through said tube to each exit means, whereby substantially all of the flowing gas molecules and atoms are subjected first to maximum electron velocities and then are subjected in succession to progressively decreasing electron velocities.

3. Apparatus for the promotion of chemical reaction through ionization and excitation of molecules and atoms in gaseous phase by a resistive type discharge characterized by multiple electron-molecule and atom collisions per cycle of a high frequency alternating electric field, comprising a reaction tube having a central entrance means and end exit means, a pair of capacitive members surrounding the reaction tube in predetermined spaced relation thereto and disposed on opposite sides of the central entrance means and spaced equally therefrom, means for applying a high frequency alternating voltage to said capacitive members to create within said tube a high frequency alternating electric field which is of substantially constant intensity transversely of the reaction tube at any point therealong within said field and in which the voltage gradient decreases longitudinally of the reaction tube from a maximum magnitude in the vicinity of the central entrance means through a range of progressively decreasing magnitudes toward each end exit means, the ratio of the internal diameter of said tube to the internal diameter of said capacitive members being less than the ratio at which voltage breakdown of the tube will occur and at which the aforesaid substantial constancy of intensity is precluded, and means for effecting flow of reactant gas at subatmospheric pressure into said entrance means and through said tube to each exit means, whereby substantially all of the flowing gas molecules and atoms are subjected first to maximum electron velocities and then are subjected in succession to progressively decreasing electron velocities.

4. Apparatus for the promotion of chemical reaction through ionization and excitation of molecules and atoms in gaseous phase by a resistive type discharge characterized by multiple electron-molecule and atom collisions per cycle of a high frequency alternating electric field, comprising a reaction tube having a central entrance means and end exit means, a helical coil surrounding the reaction tube in predetermined spaced relation thereto on both sides of the central entrance means and symmetrically disposed with respect to the central entrance means so that the latter is located substantially at the center of the coil, means for applying a high frequency alternating voltage to said coil to create within said tube a high frequency alternating electric field which is of substantially constant intensity transversely of the reaction tube at any point therealong within said field and in which the voltage gradient decreases longitudinally of the reaction tube from a maximum magnitude in the vicinity of the central entrance means through a range of progressively decreasing magnitudes toward each end exit means, the ratio of the internal diameter of said tube to the internal diameter of said coil being less than the ratio at which voltage breakdown of the tube will occur and at which the aforesaid substantial constancy of intensity is precluded, and means for effecting flow of reactant gas at subatmospheric pressure into said entrance means and through said tube to each exit means, whereby substantially all of the flowing gas molecules and atoms are subjected first to maximum electron velocities and then are subjected in succession to progressively decreasing electron velocities.

5. Apparatus for the promotion of chemical reaction through ionization and excitation of molecules and atoms in gaseous phase by a resistive type discharge characterized by multiple electron-molecule and atom collisions per cycle of a high frequency alternating electric field, comprising a reaction tube having a pair of spaced gas entrance means, a central gas exit means and end gas exit means, thus providing a plurality of gas flow paths, a helical coil surrounding the reaction tube in predetermined spaced relation thereto on both sides of the central exit means and symmetrically disposed with respect thereto, means for applying a high frequency alternating voltage to said coil to create within the coil a high frequency alternating electric field in which the voltage gradient decreases progressively in each of said paths from maximum magnitude in the vicinity of the entrance means to minimum magnitude in the vicinity of the exit means, the ratio of the internal diameter of said tube to the internal diameter of said coil being sufficient to preclude voltage breakdown of the tube and to provide substantially constant intensity of the field transversely within said tube at any point therealong, and means for effecting flow of reactant gas at subatmospheric pressure into said entrance means and within the tube to said exit means, whereby substantially all of the flowing gas molecules and atoms are subjected first to maximum electron velocities and then are subjected in succession to progressively decreasing electron velocities.

References Cited in the file of this patent

UNITED STATES PATENTS

| Number | Name | Date |
|---|---|---|
| 2,117,100 | Milas | May 10, 1938 |
| 2,257,177 | Luster | Sept. 30, 1941 |
| 2,485,476 | Cotton | Oct. 18, 1949 |